(12) United States Patent
Bloomfield et al.

(10) Patent No.: US 8,194,648 B2
(45) Date of Patent: Jun. 5, 2012

(54) CELLULAR COMMUNICATION SYSTEM AND A METHOD OF OPERATION THEREFOR

(75) Inventors: Philip C. Bloomfield, Caine (GB); David C. Padfield, Marlborough (GB)

(73) Assignee: Motorola Mobility, Inc., Libertyville, IL (US)

( * ) Notice: Subject to any disclaimer, the term of this patent is extended or adjusted under 35 U.S.C. 154(b) by 285 days.

(21) Appl. No.: 12/526,080

(22) PCT Filed: Apr. 22, 2008

(86) PCT No.: PCT/US2008/061134
§ 371 (c)(1),
(2), (4) Date: Aug. 6, 2009

(87) PCT Pub. No.: WO2008/134307
PCT Pub. Date: Nov. 6, 2008

(65) Prior Publication Data
US 2010/0315995 A1  Dec. 16, 2010

(30) Foreign Application Priority Data
Apr. 24, 2007 (GB) .................................. 0707903.1

(51) Int. Cl.
*H04W 4/00* (2009.01)
*H04L 12/66* (2006.01)
*H04L 12/28* (2006.01)
*H04L 12/56* (2006.01)

(52) U.S. Cl. ........ 370/352; 370/353; 370/356; 370/394; 370/401; 370/328

(58) Field of Classification Search .................. None
See application file for complete search history.

(56) References Cited

U.S. PATENT DOCUMENTS

| 6,668,170 | B2 * | 12/2003 | Costa et al. ................... 455/439 |
| 7,453,893 | B2 * | 11/2008 | Li et al. .......................... 370/401 |
| 2002/0064164 | A1 | 5/2002 | Barany et al. |
| 2004/0100913 | A1 | 5/2004 | Kalliokulju et al. |
| 2005/0281232 | A1 * | 12/2005 | Kim et al. ...................... 370/335 |

FOREIGN PATENT DOCUMENTS

| EP | 1168871 A1 | 1/2002 |
| EP | 1713226 A1 | 10/2006 |
| EP | 1773012 A1 | 4/2007 |
| GB | 2402027 A | 11/2004 |
| WO | 02102110 A1 | 12/2002 |
| WO | 2007073679 A1 | 7/2007 |

OTHER PUBLICATIONS

Hyun-Kyung Yoo et al.: "A media stream processing of VoIP media gateway", Communications, 2003, APCC 2003, The 9th Asia-Pacific Conference on Sep. 21-24, 2003, Piscataway, NJ, USA, IEEE, vol. 1, Sep. 21, 2003, pp. 91-94.

* cited by examiner

*Primary Examiner* — Faruk Hamza
*Assistant Examiner* — Diane Lo

(57) ABSTRACT

A cellular communication system comprises a media gateway (111) which interfaces between a packet switched network (113) and a circuit switched network (115). The media gateway (111) time aligns received packet data in response to timestamps of these. Each of first and second RNC (105, 109) comprise a Node B interface (201) which receives real time data being data of an air interface communication from the remote station (101) to a base station (103, 107) supported by the RNC (105, 109). A packet processor (203, 205) then transmits the data packets to the media gateway (111) via the packet switched network (113). A timestamp processor (207) determines timestamps for the data packets in response to a timing characteristic of the air interface communication.

8 Claims, 3 Drawing Sheets

CELLULAR COMMUNICATION SYSTEM AND A METHOD OF OPERATION THEREFOR

FIELD OF THE INVENTION

The invention relates to a cellular communication system and a radio network controller and method of operation therefor and in particular, but not exclusively, to a Universal Mobile Telecommunication System.

BACKGROUND OF THE INVENTION

Cellular communication systems have traditionally been based on circuit switched connections which facilitate real time communications that are sensitive to delays and jitter. However, increasingly cellular communication systems utilise packet switched communication to support both real time and non-real time communications.

For example, for the 3$^{rd}$ Generation Partnership Project (3GPP) Universal Mobile Telecommunication System (UMTS) includes an interface between the Radio Network Controllers (RNC) and a circuit switched network which is known as the Iu-CS interface. Despite the interface relating to circuit switched communications, it has been proposed that the Iu-CS interface can be implemented using packet switched technology and in particular Internet Protocol (IP) based transport protocols, such as the Real Time Protocol (RTP). Thus, it has been proposed to implement the Iu-CS interface using an IP packet switched network using real time protocols such as RTP to support the underlying real time communications.

In such systems, a Media GateWay (MGW) is typically implemented to interface between the packet switched network and the circuit switched network. The MGW comprises a jitter buffer which buffers the packetized real time data received from the RNCs such that the data can be provided as a real time stream to the circuit switched network. The RTP protocol specifically uses a timestamp applied by the sender to retime the circuit switched data at the MGW. The RTP functionality of the MGW also uses the timestamp to measure network jitter and also discards data packets that exceed a jitter corresponding to the jitter buffer depth.

However, this approach has a number of associated disadvantages. In particular, when a handover of a communication occurs resulting in a handover from one serving RNC to another (known as a UTRAN SRNS relocation), the RNC responsible for generating the uplink transport bearer stream transmitted to the MGW is moved from the original source RNC to the new target RNC. As the RNCs are not synchronized, the target RNC will use a timestamp which is not synchronized with the timestamp of the source RNC and accordingly the MGW will receive data packets with a discontinuity in the timestamps. To the MGW this will appear as a potentially large variation in the delay (which could even be negative) resulting in an uplink data loss. Thus, an apparent gap in the uplink data provided to the circuit switched network may occur when the timestamp source used by the RTP protocol changes from that of the source RNC to that of the target RNC resulting in either re-synchronization of the MGW jitter buffer (to the target RNC) or apparent jitter at the MGW which exceeds the jitter buffer depth (for a 3GPP system the MGW does not forward uplink data until the new timestamp is aligned with the old).

In order to address these disadvantages it is possible to closely synchronise the time bases used for timestamping between all RNCs. However, achieving such synchronisation is very complicated, impractical and results in complexity and cost increases which are undesirable as well as in reduced reliability of the system.

Hence, an improved system would be advantageous and in particular a system allowing facilitated implementation, reduced complexity, improved handover performance, reduced data loss, increased reliability and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a cellular communication system comprising: a media gateway for interfacing between a packet switched network and a circuit switched network; first and second radio network controllers coupled to the media gateway via the packet switched data network and arranged to support a real time communication from a remote station to a destination in the circuit switched network; wherein the media gateway comprises means for time aligning real time data of the real time communication received in data packets from the first and second radio network controllers via the packet switched network in response to timestamps of the data packets; and each of the first and second radio network controllers comprise: means for receiving real time data of the real time communication, the real time data being data of an air interface communication from the remote station to a base station supported by the radio network controller, means for transmitting data packets comprising the real time data to the media gateway via the packet switched network, and means for determining timestamps for the data packets in response to a timing characteristic of the air interface communication.

The invention may provide improved performance and may in particular provide improved handover operation in a system supporting a real time communication via a data packet network. Specifically, in some embodiments the invention may reduce data losses for a 3GPP cellular communication system using a packet switched network to provide an Iu-CS interface between RNCs and a media gateway. The invention may reduce complexity and/or facilitate implementation. Specifically, the invention may mitigate the requirement for synchronisation of radio network controllers.

According to another aspect of the invention there is provided a radio network controller for a cellular communication system including a media gateway for interfacing between a packet switched network and a circuit switched network; the radio network controller and another radio network controller being coupled to the media gateway via the packet switched data network and arranged to support a real time communication from a remote station to a destination in the circuit switched network and the media gateway comprising means for time aligning real time data of the real time communication received in data packets from the radio network controllers via the packet switched network in response to timestamps of the data packets;
the radio network controller comprising: means for receiving real time data of the real time communication, the real time data being data of an air interface communication from the remote station to a base station supported by the radio network controller; means for transmitting data packets comprising the real time data to the media gateway via the packet switched network; and means for determining timestamps for the data packets in response to a timing characteristic of the air interface communication.

According to another aspect of the invention there is provided method of operation for a cellular communication system including a media gateway interfacing between a packet switched network and a circuit switched network and first and second radio network controllers coupled to the media gateway via the packet switched data network and supporting a real time communication from a remote station to a destination in the circuit switched network; the method comprising: the media gateway time aligning real time data of the real time communication received in data packets from the first and second radio network controllers via the packet switched network in response to timestamps of the data packets; and each of the first and second radio network performing the steps of: receiving real time data of the real time communication, the real time data being data of an air interface communication from the remote station to a base station supported by the radio network controller, transmitting data packets comprising the real time data to the media gateway via the packet switched network, and determining timestamps for the data packets in response to a timing characteristic of the air interface communication.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a 3GPP cellular communication system and in particular to a UMTS cellular communication system wherein the Iu-CS interface is implemented using an IP based packet switched network. However, it will be appreciated that the invention is not limited to this application but may be applied to many other cellular communication systems.

Figure 1:
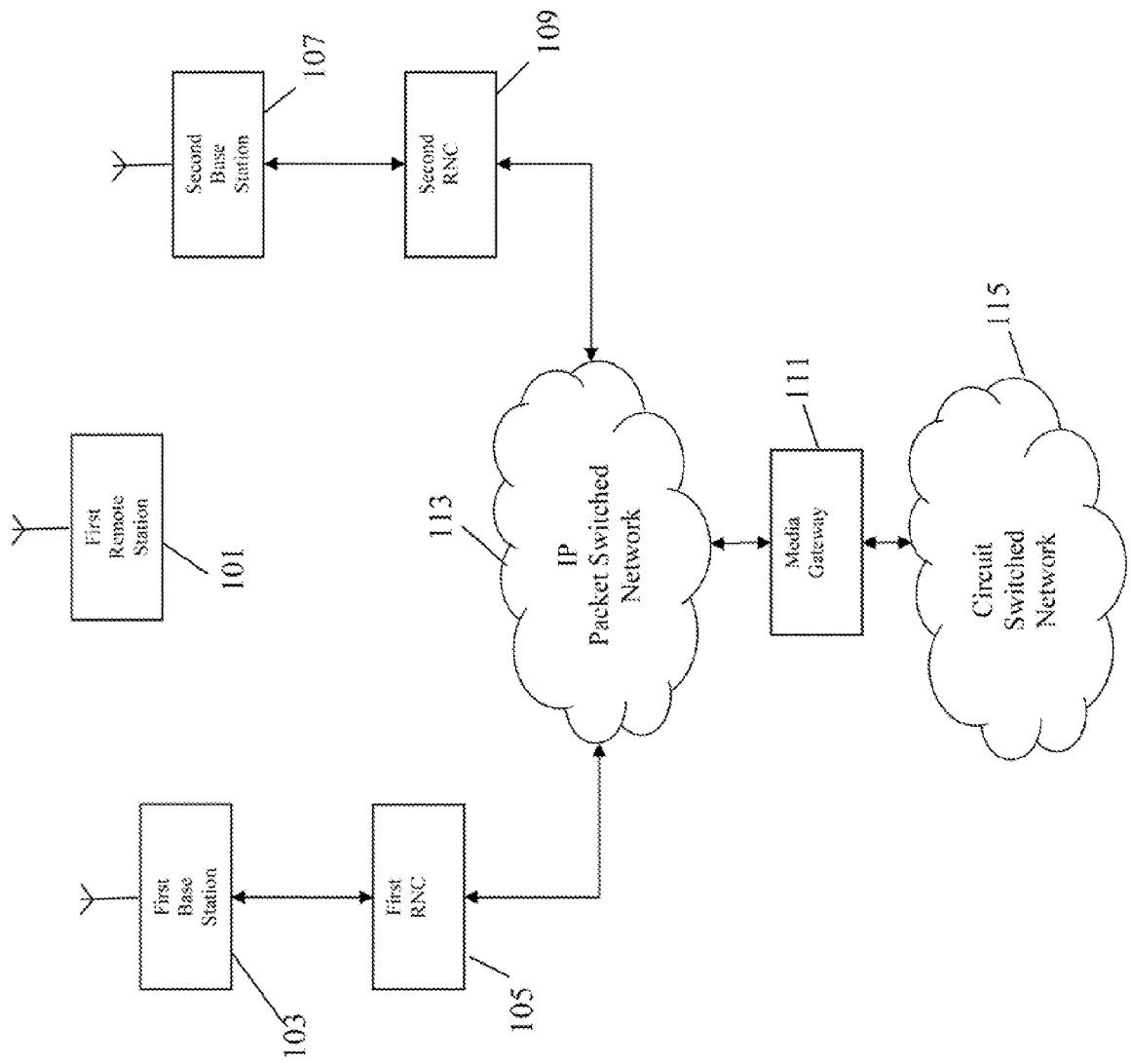
FIG. 1 illustrates an example of a cellular communication system in accordance with some embodiments of the invention.

FIG. 1 illustrates an example of a cellular communication system in accordance with some embodiments of the invention.

In the example, a first remote station 101 is initially in a first cell supported by a first base station 103, also known as a Node B in a UMTS communication system. The remote station 101 may for example be a User Equipment (UE), a mobile phone, a remote unit, a PDA or any other communication functionality capable of communicating with a base station over the air interface of the communication system.

The first base station 103 is coupled to a first Radio Network Controller (RNC) 105. An RNC performs many of the control functions related to the air interface including radio resource management and routing of data to and from appropriate base stations.

The system furthermore comprises a second base station 107 which is coupled to a second RNC 109. The second base station 107 supports a second cell which in the example is a neighbour cell of the first cell supported by the first base station 103.

The first RNC 105 and the second RNC 109 are coupled to a media gateway 111 via a packet switched network 113. The media gateway 111 is furthermore coupled to a circuit switched network 115 and provides interworking functionality between the packet switched network 113 and the circuit switched network 115.

In the example, the first remote station 101 is involved in a real time communication with a destination (which may be an intermediate destination) in the circuit switched network 115. The real time communication may for example be a voice or video communication. In the example, circuit switched techniques may be used to support the real time communication from the first remote station 101 to the first or second RNC 105, 109 and circuit switched techniques are used within the circuit switched network 115. However, the Iu-CS interface between the RNCs 107, 109 and the media gateway 111 is implemented by the packet switched network 113 and is thus implemented by packet switched communications. Specifically, the communication between the RNCs 105, 109 uses the Real Time Protocol (RTP) which is an IP protocol.

In accordance with the RTP protocol, the real time data received from the first remote station 101 is packetized and sent to the media gateway 111 in timestamped RTP packets. Due to the nature of the packet switching techniques, the communication delay may vary for the individual data packets and accordingly an element of jitter is introduced. In order to re-establish correct timing of the real time data stream, the media gateway 111 comprises a jitter buffer which buffers the received data such that the timing between different packets are aligned to adjust for delay variations. The buffering of the real time data received in the data packets is performed based on the timestamps of the RTP packets. This approach for example allows the media gateway 111 to compensate and reorder data if a later transmitted data packet is received before a previously transmitted data packet.

In the example of FIG. 1, the remote station 101 is initially served by the first base station 103 and first RNC 105 and is then handed over to the second base station 107 and the second RNC 109. Thus, SRNS (Serving Radio Network Subsystem) relocation is performed by the remote station 101 with the first RNC 105 being the source RNC and the second RNC 109 being the target RNC.

As a consequence of the handover the data packets comprising the real time data for the real time communication from the remote station 101 are switched from originating at the first RNC 105 to originating in the second RNC 109.

In a conventional system, the RNCs use time stamping which is based on the local time base of the RNC and as the RNCs are not synchronised (due to the excessive complexity required for reliable synchronisation), the timestamps for the RTP packets are accordingly not synchronised. Indeed, in conventional 3GPP operation, the timestamp sent by the target RNC would be started at a random value which will appear to the media gateway 111 as a discontinuity in the uplink stream.

Thus, the RTP data packets received at the media gateway 111 will experience a potentially large step when the remote station 101 is handed over between the RNCs 105, 109. This typically leads to a potentially significant data loss which is experienced as a gap in the uplink real time data from the remote station 101. Specifically, an uplink data loss results when the timestamp source used by RTP in the target RNC deviates sufficiently from the timestamp source of the source RNC to result in either re-synchronization of the media gateway jitter buffer (to the new source) or when the apparent jitter at the media gateway exceeds the jitter buffer depth.

In the system of FIG. 1, the timestamping used by the RNCs 105, 107 is determined in response to a timing characteristic of the air interface communication from the first remote station 101. Specifically, an air interface frame number for the air interface communication is used to ensure that the RTP data packet timestamps are consistent for the transport bearer stream from the two RNCs 105, 109 to the media gateway 111. In the UMTS system of FIG. 1, the RNCs 105, 109 apply an RTP timestamp derived from the air interface Connection Frame Number (CFN). As the CFN depends only on the air interface communication and is independent of which RNC is serving the remote station 101 this ensures that the timestamps of the IuSC data packets transmitted to the media gateway 111 remain consistent across any number of RNC relocations. It also provides the benefit of eliminating any software induced jitter at the RNCs 105, 109 and of not requiring a synchronized clock to be shared by the RNCs 105, 109.

As the source and target RNC (the first and second RNC 105, 109) apply the same RTP timestamp (and sequence number) based upon the CFN, the timestamp sequence of the data packets received by the media gateway 111 is contiguous despite the SRNS relocation. Since, the media gateway 111 therefore does not receive a discontinuity in the timestamps it does not have to re-synchronise its jitter buffer and does not interpret the jitter to be higher than the capacity of the jitter buffer. Thus, delay variations (jitter) in the Iu-CS network would be handled by the media gateway jitter buffer in a consistent fashion as the timestamps of the uplink real time stream appear contiguous. Data packets delayed by greater than the jitter tolerance of the media gateway would still be lost similarly to when such delays occurring during normal (non-handover) operation.

Figure 2:
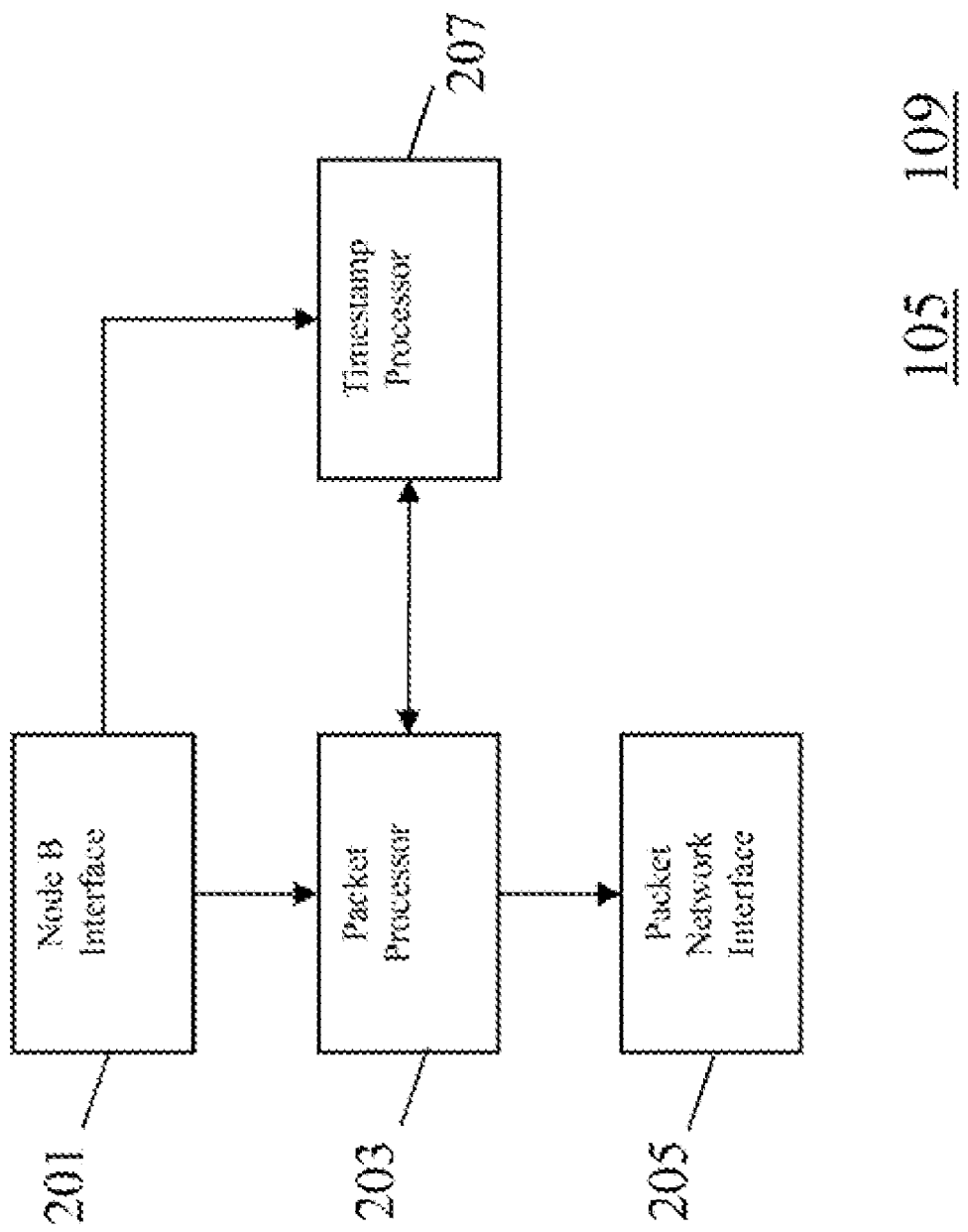
FIG. 2 illustrates an example of a radio network controller in accordance with some embodiments of the invention.

FIG. 2 illustrates the first and second RNC 105, 109 in more detail. For brevity FIG. 2 will mainly be described with reference to a situation where the two RNCs comprise identical functionality.

The RNCs 105, 109 comprise a Node B interface 201 which interfaces the RNCs 105, 109 to the base station 103, 107 served by the individual RNC 105, 109 and specifically the Node B interface 201 receives the real time data transmitted from the remote station 101 to the base stations 103, 107 over the air interface. The communication of the real time data from the remote station to the RNCs 105, 109 use fixed resource allocations on the associated interfaces (i.e. fixed time allocations on the air interface and the interface between the base stations 103, 107 and the RNCs 105, 109) and is therefore received in real time at the RNCs 103, 107. Thus, the connection between the remote station 101 and the RNC 105, 109 is a real time connection corresponding to a circuit switched connection.

The Node B interface 201 is coupled to a packet processor 203 which is operable to packetize the received real time data from the remote station 101 for transmission over the IP packet switched network 113. Specifically, the packet processor 203 generates RTP data packets with each data packet comprising the real time data for a small time interval.

The packet processor 203 is coupled to a packet network interface 205 which interfaces the RNC 105, 109 to the packet switched network 113. The packet network interface 205 specifically transmits the transport bearer RTP data packets to the media gateway 111.

The RTP data packets are timestamped in order to allow the media gateway 111 to perform time alignment of the real time data based on RTP data packets which are received with differing delay and potentially in a different order due to the variations in routing of the packet data in the packet switched network 113. Thus, the media gateway 111 can store the received data in a jitter buffer together with the associated timestamps and can read data from the jitter buffer in a real time format by selecting the data sequentially in response to the timestamps. The timestamps are in this way used to provide a continuous real time data stream to the circuit switched network 115.

The RNCs 105, 109 comprise a timestamp processor 207 which is coupled to the Node B interface 201 and the packet processor 203. The timestamp processor 207 is arranged to determine the timestamps for the data packets in response to a timing characteristic of the air interface communication between the remote station 101 and the currently serving base station 103, 107. In the specific example, the Connection Frame Number (CFN) is used to determine a timestamp for the real time data. Thus, the CFN in which specific real time data was transmitted from the remote station 101 is used to determine the timestamp for the RTP data packet in which this data is transmitted to the media gateway 111. Specifically, the timestamp may be set to be equal to the CFN.

The timestamps determined for a given RTP data packet is then included in the header of the data packet. Specifically, the timestamp may be inserted in the timestamp field of the RTP header. Alternatively or additionally, the sequence number of the RTP header may be used for timestamp information. In the specific example, the RNCs 105, 109 directly insert the CFN in the timestamp header field of the RTP data packets.

In a UMTS communication system, the CFN is already known to the serving RNC 105, 109 and can therefore directly be used by the timestamp processor 207 without requiring any additional information to be communicated from the base stations 103, 107. Thus, prior to the RNC handover/SRNS relocation, the first RNC 105 has information of the CFN and uses this to determine the RTP data packet time stamps.

In the example, the serving RNC also comprises functionality for transmitting an indication of the current value of the air interface timing characteristic used to generate the time stamps to the target RNC. Specifically, as part of an UMTS RNC handover/SRNS relocation procedure, the CFN is communicated from the serving RNC to the target RNC. Thus, during the handover of the remote station 101, the second RNC 109 is informed of the CFN and it can readily begin to use this to provide timestamps for the RTP data packets.

As both RNCs 105, 109 use the same time reference of the air interface communication, namely the CFN, to generate the timestamps for the RTP data packets, the data packets are transmitted with contiguous timestamps without requiring synchronisation of the RNCs 105, 109. The media gateway 111 can accordingly use the same approach for time alignment during the handover as during normal operation without this resulting in a data gap or loss. Thus, improved operation is achieved.

In some embodiments, the RNC functionality and base station functionality may be combined such that an RNC supports only a single base station and cell. For example, it has been proposed to deploy residential access points having only a target coverage area of a single residential dwelling or house. It has furthermore been proposed that such residential access points may comprise both the required base station and RNC functionality required to support the individual cell. In such systems a large number of RNCs may thus be deployed and accordingly a large number of RNC handovers/SRNS relocations will occur and therefore frequent data losses associated with such handovers will clearly be unacceptable.

However, in such systems, the time stamping of RTP data packets by the RNCs may be performed as previously described thereby significantly reducing the risk of uplink data loss and providing improved performance and quality of service to the end user.

Figure 3:
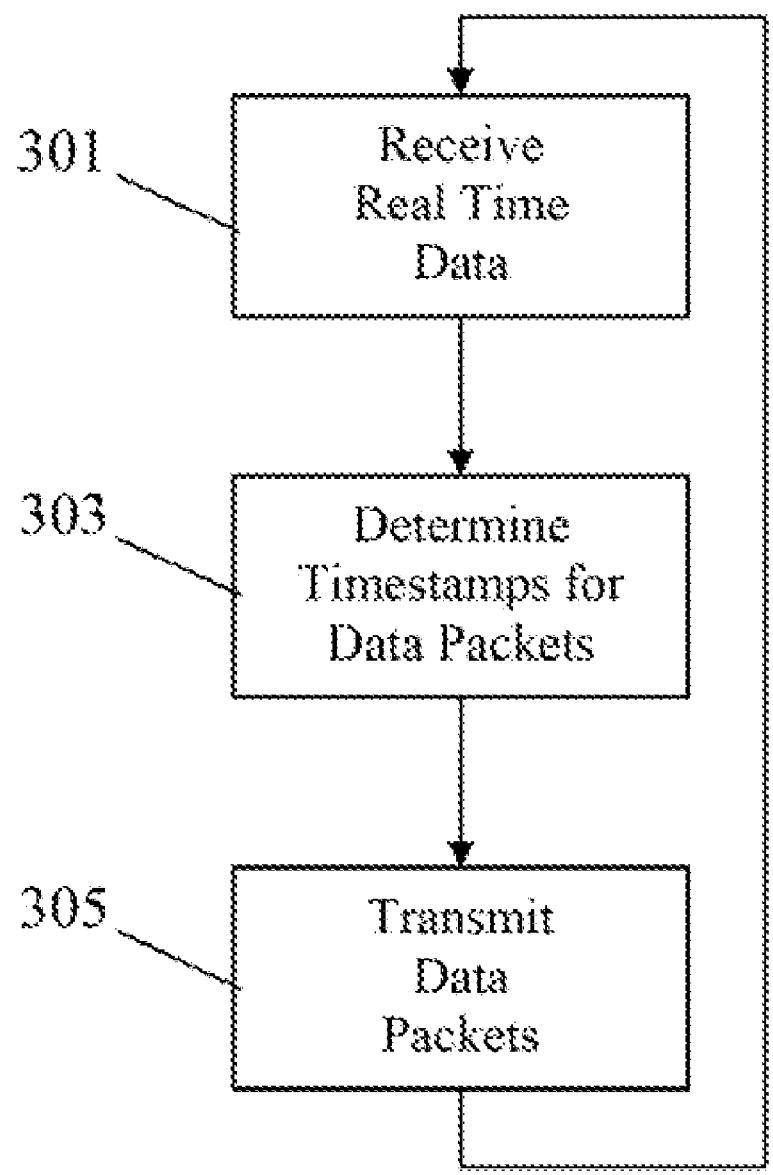
FIG. 3 illustrates an example of a method of operation for a radio network controller in accordance with some embodiments of the invention.

FIG. 3 illustrates a method of operation for first and second radio network controllers of a cellular communication system including a media gateway interfacing between a packet switched network and a circuit switched network. The first and second radio network controllers are coupled to the media gateway via the packet switched data network and support a real time communication from a remote station to a destination in the circuit switched network.

The method initiates in step 301 wherein the radio network controllers receive real time data of the real time communication. The real time data is data of an air interface communication from the remote station to a base station supported by the radio network controllers.

Step 301 is followed by step 303 wherein timestamps are determined for data packets to be transmitted to the media gateway in response to a timing characteristic of the air interface communication.

Step 303 is followed by step 305 wherein the data packets comprising the real time data are transmitted to the media gateway via the packet switched network.

In the cellular communication system, the media gateway time aligns real time data of the real time communication received in the data packets from the first and second radio network controllers via the packet switched network in response to timestamps of the data packets.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A cellular communication system comprising:
a media gateway for interfacing between a packet switched network and a circuit switched network; and
first and second radio network controllers coupled to the media gateway via the packet switched data network and arranged to support a real time communication from a remote station to a destination in the circuit switched network;
wherein the media gateway comprises means for time aligning real time data of the real time communication received in data packets from the first and second radio network controllers via the packet switched network in response to timestamps of the data packets;
wherein each of the first and second radio network controllers comprise:
means for receiving real time data of the real time communication, the real time data being data of an air interface communication from the remote station to a base station supported by the radio network controller;
means for transmitting data packets comprising the real time data to the media gateway via the packet switched network; and
means for determining timestamps for the data packets in response to a timing characteristic of the air interface communication; and
wherein the timing characteristic is an air interface frame number of the air interface communication.

2. The cellular communication system of claim 1 wherein the first radio network controller is a source radio network controller for supporting the real time communication prior to a radio network controller handover and the second radio network controller is a target radio network controller for supporting the real time communication following the radio network controller handover.

3. The cellular communication system of claim 2 wherein the first radio network controller comprises means for transmitting an indication of a current value of the timing characteristic to the second radio network controller in response to the radio network controller handover.

4. The cellular communication system of claim 1:
wherein the communication of the data packets is in accordance with a Real Time Protocol, RTP; and
wherein the first and second radio network controllers are arranged to set at least one of a timestamp field or a sequence number field of an RTP header of the data packets in response to the timing characteristic.

5. The cellular communication system of claim 1 wherein at least one of the first and second radio network controllers is arranged to support only a single base station.

6. The cellular communication system of claim 1 wherein the data packets are transport bearer data packets.

7. The cellular communication system of claim 1 wherein the data packet network supports an Iu-CS interface between the first and second radio network controllers and the media gateway.

8. A method of operation for a cellular communication system including a media gateway interfacing between a packet switched network and a circuit switched network and first and second radio network controllers coupled to the media gateway via the packet switched data network and supporting a real time communication from a remote station to a destination in the circuit switched network; the method comprising:
- the media gateway time aligning real time data of the real time communication received in data packets from the first and second radio network controllers via the packet switched network in response to timestamps of the data packets; and
- each of the first and second radio network controllers performing the steps of:
  - receiving real time data of the real time communication, the real time data being data of an air interface communication from the remote station to a base station supported by the radio network controller;
  - transmitting data packets comprising the real time data to the media gateway via the packet switched network; and
  - determining timestamps for the data packets in response to a timing characteristic of the air interface communication;
- wherein the timing characteristic is an air interface frame number of the air interface communication.

\* \* \* \* \*